A. A. DE LOACH.
SAWMILL FEED MECHANISM.
APPLICATION FILED JULY 1, 1909.

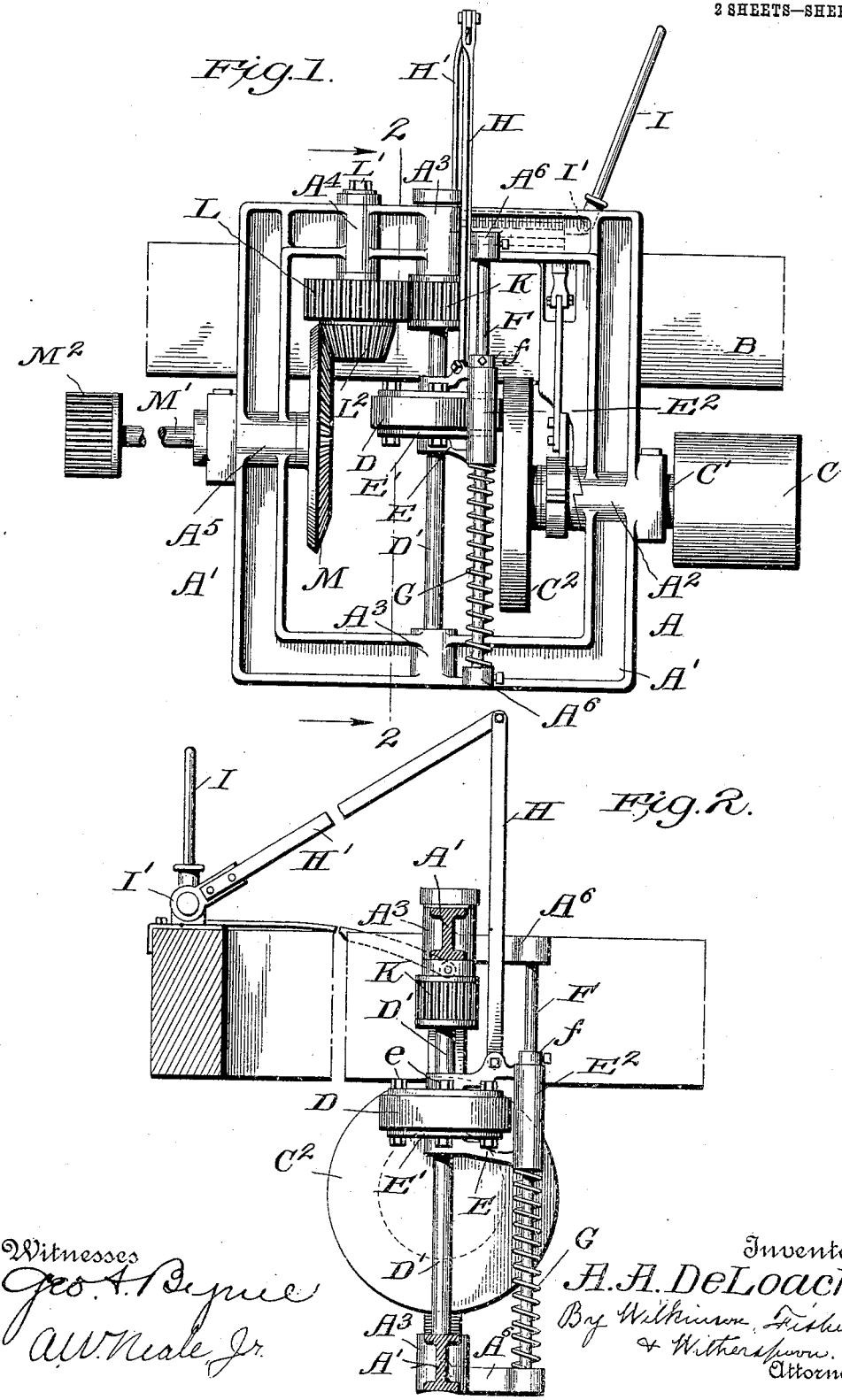

955,057.

Patented Apr. 12, 1910.

2 SHEETS—SHEET 2.

Witnesses
Geo. A. Byrne
Jas. E. Dodge

Inventor
H. A. DeLoach,

By Wilkinson, Fisher & Witherspoon
Attorneys

UNITED STATES PATENT OFFICE.

ALONZO A. DE LOACH, OF BRIDGEPORT, ALABAMA.

SAWMILL FEED MECHANISM.

955,057.　　　Specification of Letters Patent.　　Patented Apr. 12, 1910.

Application filed July 1, 1909. Serial No. 505,530.

*To all whom it may concern:*

Be it known that I, ALONZO A. DE LOACH, a citizen of the United States, residing at Bridgeport, in the county of Jackson and State of Alabama, have invented certain new and useful Improvements in Sawmill Feed Mechanisms; and I do hereby declare the following to be a full, clear, and exact description of the invention, such as will enable others skilled in the art to which it appertains to make and use the same.

My present invention relates to improvements in sawmill feeds, and relates more especially to that class of feeds known as variable friction feeds, in which the speed of the movement of the carriage in both directions may be varied within predetermined limits.

My invention will be understood by reference to the accompanying drawings, in which the same parts are indicated by the same characters throughout the several views.

Figure 3:
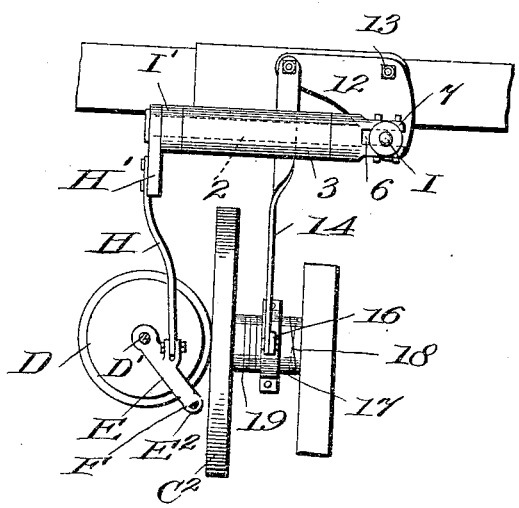
Figure 4:
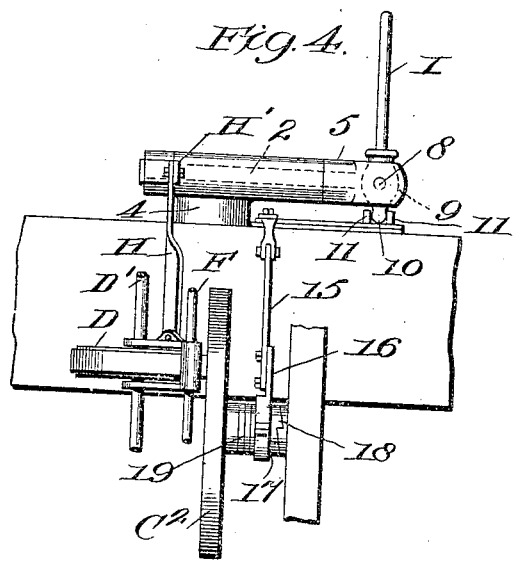

Figure 1 is a side view, showing the entire apparatus, the saw-mill carriage being omitted. Fig. 2 shows a section along the line 2—2 of Fig. 1, and looking in the direction of the arrows. Fig. 3 is a partial plan view showing the operating lever and its connections. Fig. 4 is a side view of the parts shown in Fig. 3.

A represents a metal frame, preferably cast in one piece, in a rectangular form, with channel bars A′ and bearing bosses $A^2$, $A^3$, $A^4$, $A^5$, perforated to receive the various shafts or spindles of the feed gearing, as will be hereinafter described.

The frame A is connected to any suitable platform, or support B, which latter, not being a part of my invention, is merely illustrated diagrammatically in the figures.

C represents a driving pulley, driven from any suitable source of power, which pulley is mounted on a shaft C′, carrying the friction disk $C^2$.

D is a second friction disk, splined to the shaft D′ and having its axis at right angles to the axis of the disk $C^2$, which sliding disk is clamped between the plates E′ by means of the bolts e, and these plates E′ rotate between the jaws of the frame E, which frame is provided with a sleeve $E^2$, sliding on the rod F, fixed between the arms $A^6$ of the frame A. This rod F is provided with a stop f to limit the travel of the friction disk D in one direction, and its travel in the opposite direction is controlled by the coil spring G, which normally tends to restore the parts to the position shown in Fig. 2.

The frame E is moved up and down by the connecting rod H, operated by the crank H′, fastened to the collar I′, operated by the arm or lever I, to which arm, a hand spike, not shown, may be applied, to secure the desired leverage, if needed.

The shaft D′ has fast thereon the pinion K, meshing with the gear wheel L, mounted on the shaft L′, journaled in the boss $A^4$. This shaft L′ carries a beveled pinion $L^2$, meshing with the beveled gear M, fast on the shaft M′, which shaft carries the pinion $M^2$, meshing with the rack of the carriage, not shown.

It will be obvious that if the pulley C be driven in a constant direction, the direction of motion of the gear $M^2$, and consequently of the saw-mill carriage may be varied by shifting the disk D from one side to the other of the friction disk $C^2$, and that the speed of the carriage in either direction may be varied by moving the disk D toward or away from the axis of the disk $C^2$.

The spring G not only serves as a counterbalance to the weight of the parts carried by the frame E, but also serves to restore those parts to their initial position, as shown in Fig. 1.

The collar I′ is fastened to a shaft 2, loosely mounted in a long sleeve or bearing 3, on the support 4 and at the other end the shaft has fastened to it a collar 5, slotted as shown at 6, leaving ears 7. The lever I has an enlargement near its lower end, through which and the ears 7 passes a pin 8 which serves as a fulcrum for the lever I. The enlarged part 9 of the lever I is flattened, so as to move freely in the slot 6. The lower end of the lever I is rounded as shown at 10 and fits within the lugs 11 on a bell crank plate or lever 12, pivoted at 13 to a part of the frame.

To one end of the bell crank lever 12 is pivotally attached a rod or arm 14 and to the other end of the rod 14 is pivotally attached a link 15, the other end of which is rigidly attached to an arm 16 on the collar 17, which is loosely mounted on the shaft C′. The collar 17 is provided with a cam face 18, adapted to engage with a similarly shaped but oppositely located cam face on one of the angle bars of the frame. On one side, the collar is adapted to bear against the hub of the disk C², and an antifriction bearing, the outside of which is indicated by the lines 19, is located between one end of the collar 17 and the hub of the friction disk.

The operation is as follows: By turning the lever I to the right from the position shown in Fig. 2, the friction disk D may be moved longitudinally to the friction disk C², this movement rocking the shaft 2 and thereby, by means of the collar I', lever H', link H, and frame E, shifting said disk D. By moving the lever I to the right or left from the position shown in Fig. 4, the collar 17 is moved so as to bring the friction disk C² forcibly against the disk D by means of the cam faces 18. By moving the lever I so that these clutch faces 18 will force the friction disk D out against the hub of the friction disk C², the latter will be caused to bear against the friction disk D with sufficient force to transmit motion from the driving pulley C, which is constantly running. This movement may also be used to compensate for wear between the disks C² and D. Means for locking the lever I may be employed, if desired, but usually they are not necessary, as the operator holds the lever in the position desired. The operator, therefore, by moving the lever I in two different planes, can easily stop or start the motion of the carriage or reverse it without stopping the driving pulley C, and the shifting of the friction disk D across the face of the wheel C is easily accomplished when the lever I is in the proper position.

I claim:—

1. In a saw-mill feed mechanism, the combination of a supporting frame, a shaft vertically arranged in said frame, a friction disk splined on said shaft but adapted to slide thereon, a frame adapted to embrace said disk but not to interfere with its revolution, a sleeve connected to said frame, a shaft on which said sleeve is mounted, said shaft being provided with a stop limiting the motion of said sleeve in one direction, a spring surrounding said second named shaft and against which said sleeve bears, a friction disk adapted at times to contact with said first named disk, and means for moving said sleeve and thereby said first named friction disk, including a lever pivotally mounted on the frame and connections between said lever and said sleeve, substantially as described.

2. In a saw mill feed mechanism, the combination of a frame, a friction disk journaled in said frame, a shaft extending across said frame parallel to the face of said friction disk, a second friction disk slidably mounted on said shaft and having its periphery engaging the face of the first friction disk, means for moving said second friction disk longitudinally on said shaft, a pinion fast on said shaft, a gear wheel engaging said pinion, a beveled pinion fast on the same shaft with said gear wheel, a shaft journaled on the opposite side of said frame from said first friction disk, and a beveled gear mounted on one end of said shaft and engaging said beveled pinion with a pinion mounted on the other end of said shaft and adapted to engage the rack of the saw-mill carriage, substantially as described.

3. In a saw mill feed mechanism, the combination of a rectangular frame, a friction disk journaled at one side of said frame with means for driving said friction disk, a shaft extending across said frame parallel to the face of said friction disk, a second friction disk slidably mounted on said shaft and having its periphery engaging the face of the first friction disk, hand-operated mechanism for moving said second friction disk longitudinally on said shaft, a coil spring normaly tending to restore said second disk to the initial position, a pinion fast on said shaft, a gear wheel engaging said pinion, a beveled pinion fast on the same shaft with said gear wheel, a shaft journaled on the opposite side of said frame from said first friction disk, and a beveled gear mounted on one end of said shaft and engaging said beveled pinion with a pinion mounted on the other end of said shaft and adapted to engage the rack of the saw-mill carriage, substantially as described.

4. In a saw mill feed mechanism, the combination of a frame, a friction disk journaled in said frame, a shaft extending across said frame parallel to the face of said friction disk, a second friction disk slidably mounted on said shaft and having its periphery engaging the face of the first friction disk, means for moving said second friction disk longitudinally on said shaft, comprising a rod spanning said frame and parallel to said shaft, jaws slidably mounted on said rod and engaging the opposite sides of said second disk, means operable by hand for moving said jaws in either direction on said rod, and a coil spring mounted on said rod and adapted to restore said jaws to the initial position when released, a pinion fast on said shaft, a gear wheel engaging said pinion, a beveled pinion fast on the same shaft with said gear wheel, a shaft journaled on the opposite side of said frame from said first friction disk, a beveled gear mounted on one end of said shaft and engaging said beveled pinion, with a pinion mounted on the other end of said shaft and adapted to engage the rack of the saw-mill carriage, substantially as described.

5. In a saw mill feed mechanism, the combination of a rectangular frame, a friction disk journaled in said frame, with means for driving said friction disk, a shaft extending across said frame parallel to the face of said friction disk, a second friction disk slidably mounted on said shaft and having its periphery engaging the face of the first friction disk, means for moving said second friction disk longitudinally on said shaft, comprising a rod spanning said frame and parallel to said shaft, jaws slidably mounted on said rod and engaging the opposite sides of said second disk, a system of levers for moving said jaws on said rod, a pinion fast on said shaft, a gear wheel engaging said pinion, a beveled pinion fast on the same shaft with said gear wheel, a shaft journaled on the opposite side of said frame from said pulley, a beveled gear mounted on one end of said shaft and engaging said beveled pinion, with a pinion mounted on the other end of said shaft and adapted to engage the rack of the saw-mill carriage, substantially as described.

In testimony whereof, I affix my signature, in presence of two witnesses.

ALONZO A. DE LOACH.

Witnesses:
C. P. CAMPBELL,
FRED ROBINSON.